April 5, 1966   J. H. CALDWELL   3,244,277
MACHINE FOR SIZE-GRADING FRUIT OR THE LIKE
Filed Sept. 30, 1963   4 Sheets-Sheet 3

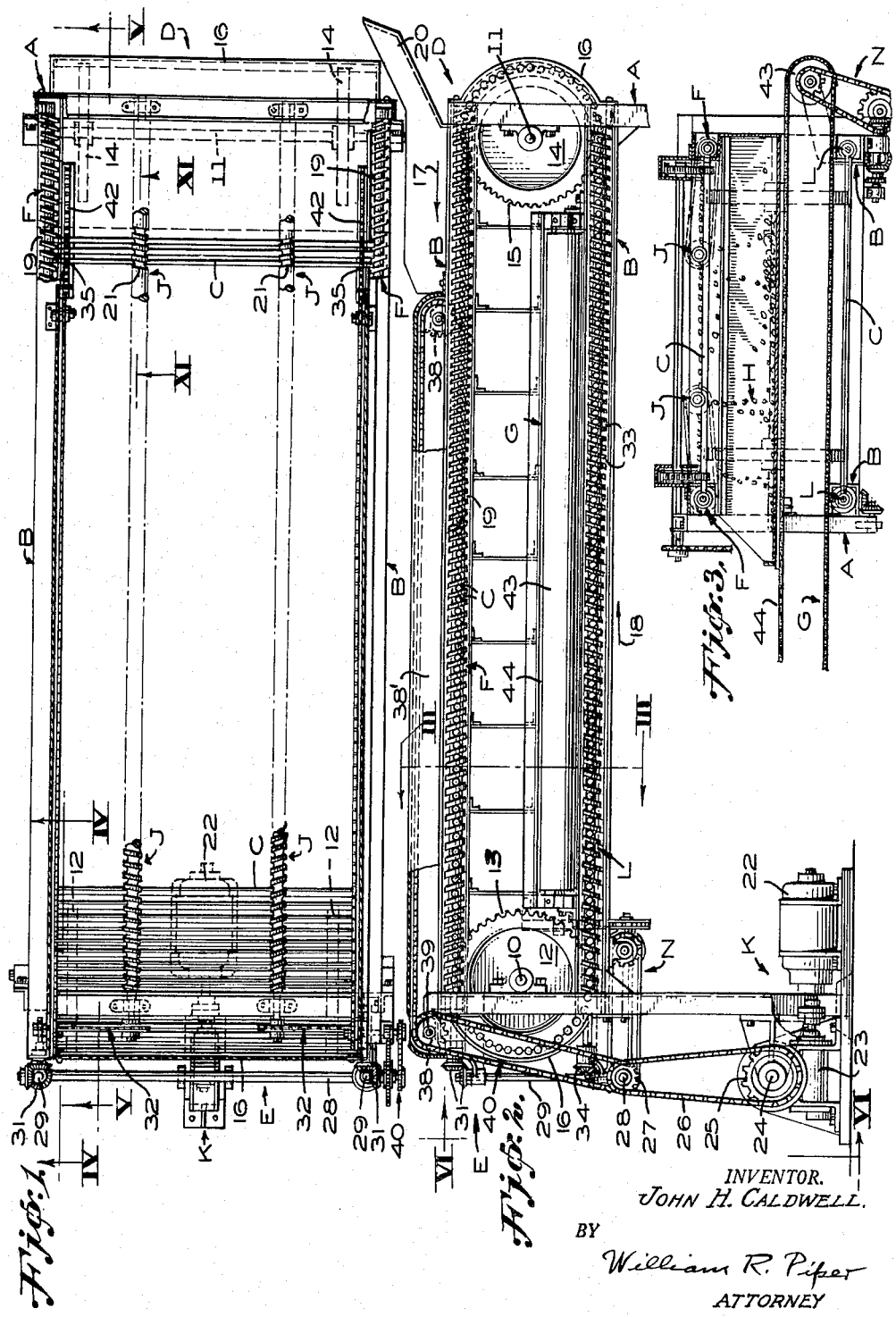

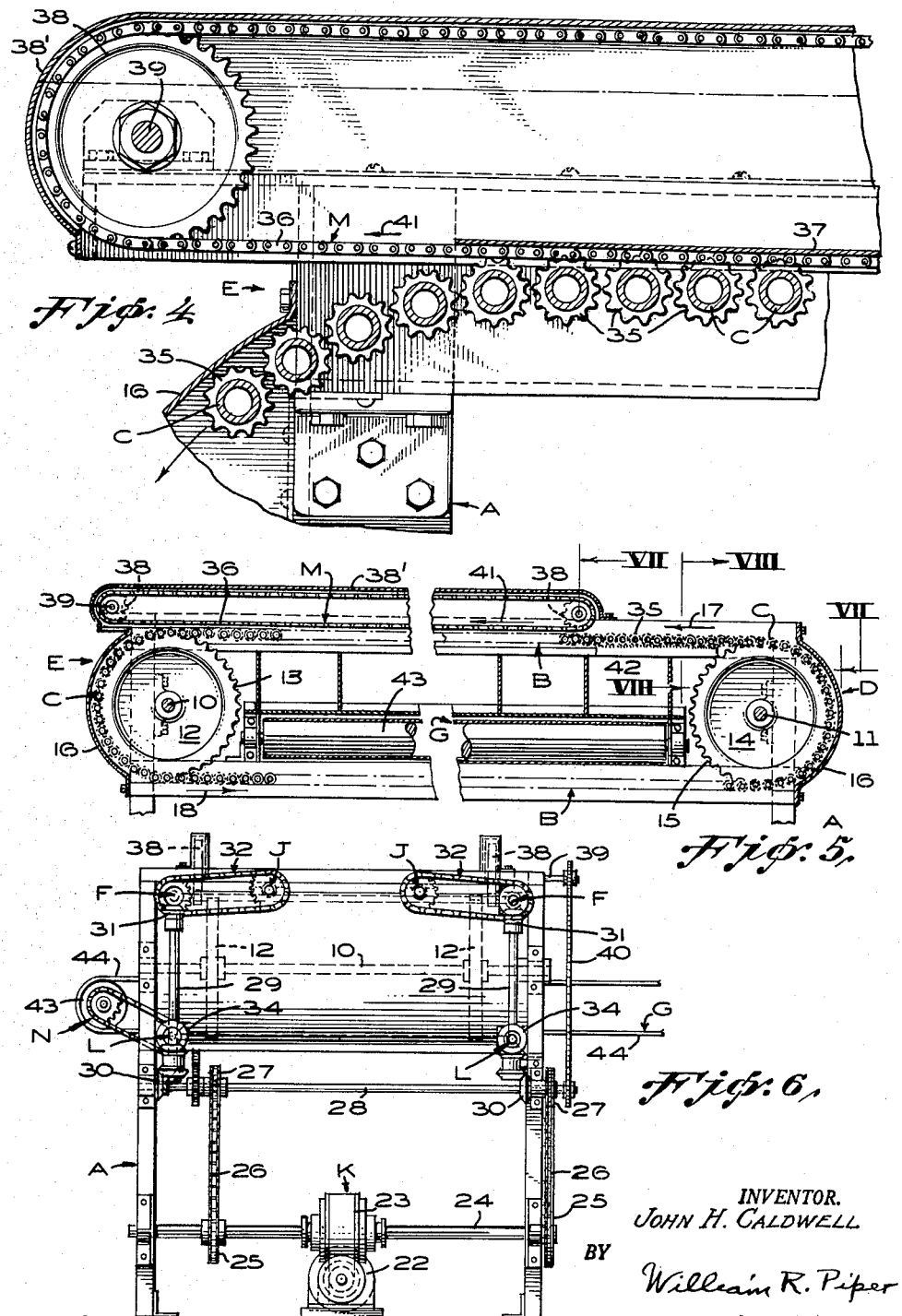

INVENTOR.
JOHN H. CALDWELL.
BY
William R. Piper
ATTORNEY.

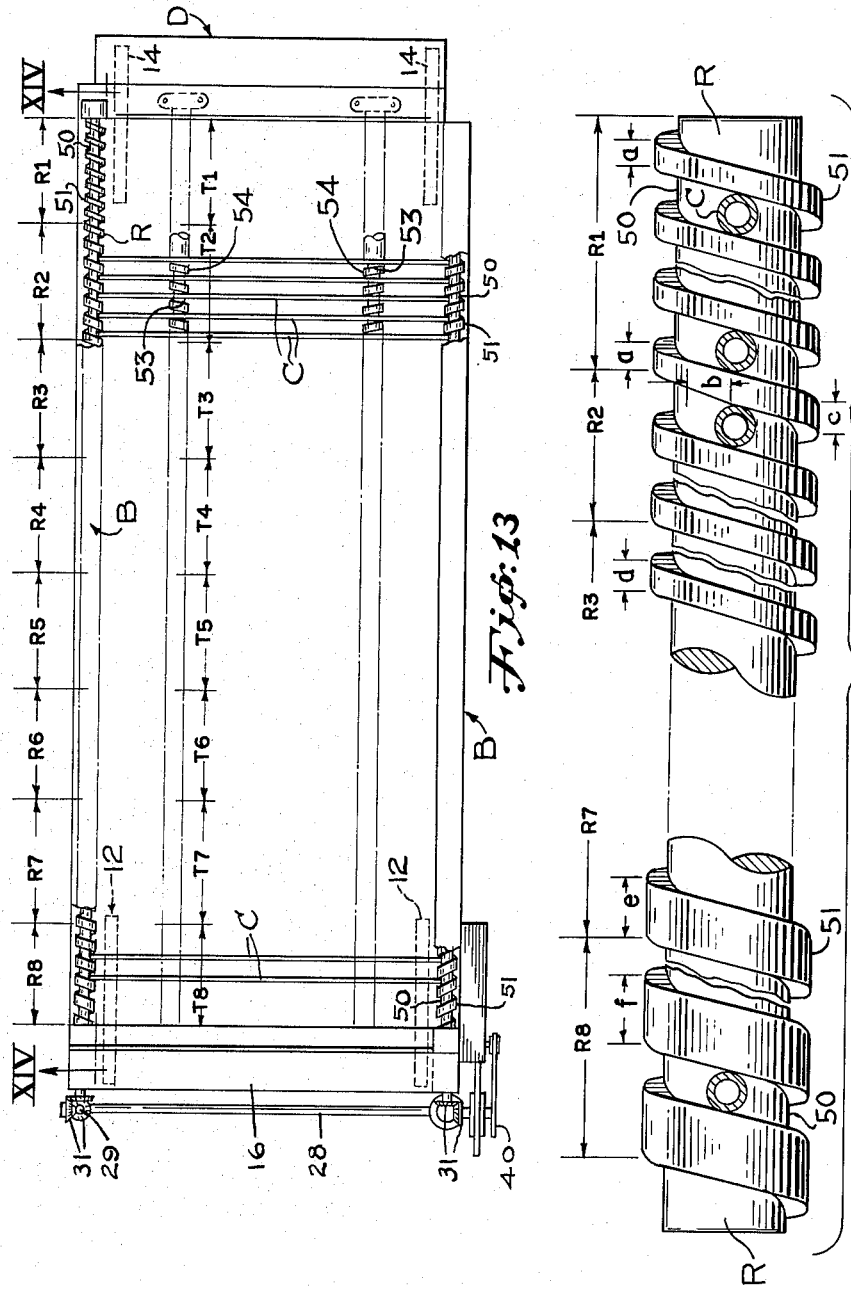

United States Patent Office 3,244,277
Patented Apr. 5, 1966

3,244,277
MACHINE FOR SIZE-GRADING FRUIT
OR THE LIKE
John H. Caldwell, 5008 U St., Sacramento, Calif.
Filed Sept. 30, 1963, Ser. No. 312,515
11 Claims. (Cl. 209—106)

The present invention relates to improvements in a machine for size-grading fruit or the like, and it consists in the combinations, constructions and arrangements of parts hereinafter described and claimed.

More specifically, this invention pertains to that type of grading machines providing a continuous series of independent rollers, which are moved in an orbital path extending from a front receiving or feed end of the machine to the remote or rear end thereof, and thence returning back to the receiving end. As these rollers are advanced along an upper reach, adjacent rollers are gradually separated farther apart so as to provide increasing widths of spaces through which fruit or the like may gravitate.

It is particularly proposed in this invention to provide positive means for rotating the sorting and grading rollers about their longitudinal axes to assure passage of the fruit or the like through the spaces defined by the rollers. The rollers will rotate the fruit and cause the fruit axes to parallel the axes of the rollers. A better grading of the fruit results.

Moreover, it is a further object to rotate these rollers at a higher speed as they pass through the region of the feed end of the machine, causing the fruit or the like to spread out for efficient sorting operations. As the rollers are advanced toward the rear end of the machine, they continue to rotate, but at a slower speed, to give ample time for the sorting and grading of the fruit to be accomplished.

As a still further object, it is proposed to utilize relatively long sorting rollers of small diameters, and to prevent these rollers from bowing horizontally intermediate of their ends, thereby overcoming inaccurate sorting due to varying spacing widths between adjacent rollers and between the ends of the rollers.

Another object is to provide improved positive means for moving the sorting rollers from the upper to the lower reach in the orbital path, and for returning the rollers to the upper reach.

A modified form of the invention shows means for stepwise increasing the spacing between adjacent rollers after the rollers have been maintained at a predetermined spacing for a definite distance of their travel along the upper reach of their orbital path.

Other objects and advantages will appear as the specification proceeds, and the novel features will be set forth in the claims hereunto appended.

Drawings

For a better understanding of this invention, reference should be had to the accompanying drawings, forming part of this application, in which:

FIGURE 1 is a top plan view of my machine, parts being shown in section.

FIGURE 2 is a side elevational view thereof, partly in section.

FIGURE 3 is a vertical transverse sectional view taken along the line III—III of FIGURE 2.

FIGURES 4 and 5 are vertical longitudinal sectional views taken along the planes IV—IV and V—V, respectively, of FIGURE 1.

FIGURE 6 is an end view of the machine, as seen from the plane VI—VI of FIGURE 2.

Figure 12:
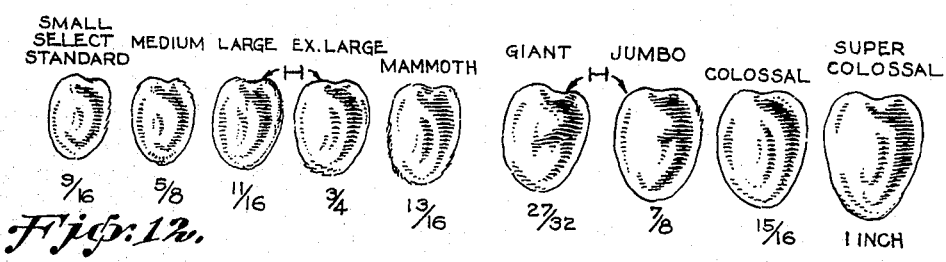
Figure 9:
FIGURE 9 is a side elevational view of one of the worm shafts shown in sections that is employed for advancing the grading rollers.
Figure 7:
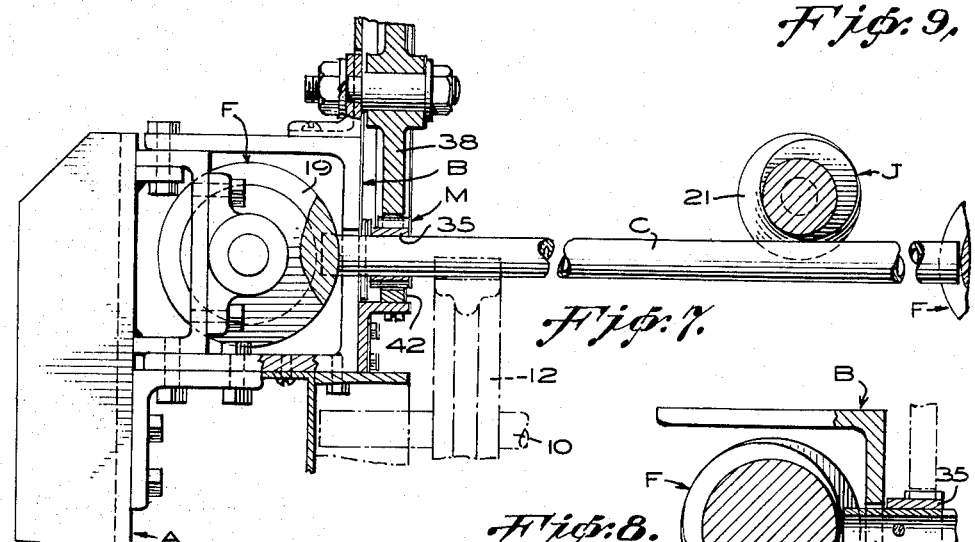
FIGURES 7 and 8 are enlarged sectional views taken along the vertical lines VII—VII and VIII—VIII, respectively of FIGURE 5.
Figure 8:
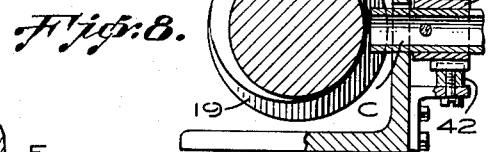
Figure 10:
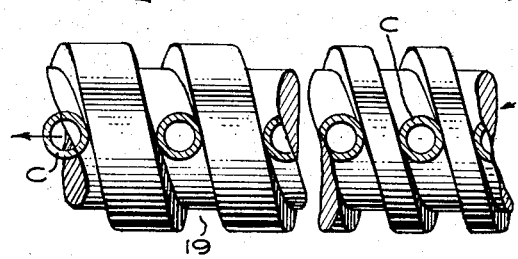
FIGURE 10 is an enlarged view of two portions of roller shown in FIGURE 9.

FIGURE 12 discloses various sizes of olives, which may be sorted with my machine, by way of example.

FIGURE 13 is a top plan view of a modified form of the device in which the worm shafts have helical grooves therein that maintain a certain pitch for a number of turns and then the pitch is altered for a succeeding number of turns this being repeated as many times as it is desired to have different grading sizes for the fruit.

FIGURE 14 is a longitudinal section taken along the line XIV—XIV of FIGURE 13, and shows portions of the worm shaft on a much larger scale.

While I have shown only the preferred forms of my invention, it should be understood that various changes, or modifications, may be made within the scope of the annexed claims, without departing from the spirit thereof.

Detailed description

In carrying out my invention, I provide a supporting frame, indicated generally at A having transverse shafts 10 and 11 journalled at opposite ends thereof. Pairs of laterally-spaced sprockets 12—12 and 14—14 are mounted on the shafts 10 and 11, respectively. The sprockets 12—12 have peripheral grooves 13 therein and the sprockets 14—14 have peripheral grooves 15 therein for a purpose hereinafter described.

It will be noted that a pair of spaced-apart and parallel guideways B extend longitudinally of the supporting frame A and are placed at opposing sides of the latter. Each of these guideways has upper and lower reaches, which are interconnected by curved guideway portions 16 conforming to curved peripheral sections of the sprockets 12—12 and 14—14 at the opposite ends of the machine. These guideways and portions define orbital paths, along which an endless series of parallel sorting and grading rollers C are advanced.

These sorting and grading rollers extend transversely between and are mounted for independent movement along the endless orbital paths of the guideways B and are receivable in the more widely spaced notches 13 in the peripheries of the sprockets 12—12 when moving from the upper to the lower reach. The rollers are also moved along the lower reach of the guideways B and enter the more closely spaced notches 15 formed in the sprockets 14—14 when they move from the lower to the upper reach. The curved guideway portions 16—16 coact to retain the ends of the rollers in the notches 13 and 15 of the sprockets 12 and 14, respectively, during the movement of the rollers from the upper reach to the lower one and vice versa.

Broadly speaking, the machine has a receiving or feed end D at the front thereof. Those rollers C in the upper reach of the endless series of independent sorting and grading rollers are advanced in the direction of the arrow 17 toward the rear end E of the machine; see FIGURE 2. After passing downwardly over the rear sprockets 12—12, the independent sorting and grading rollers are returned in the direction of arrow 18 to the front sprockets 14—14, where they are elevated upwardly to the upper reach by these sprockets.

With particular reference to FIGURES 1-3 and 7-10, it will be apparent that I provide a top pair of longitudinally-extending worm shafts F—F, which register with the upper reaches of the guideways B. These worm shafts have variable-pitch grooves 19 that receive the ends of the sorting rollers to advance the latter in the direction of the arrow 17 when these shafts are rotated These grooves 19 gradually increase in pitch in a direction corresponding with advancement of the sorting and grading rollers in the upper reach.

In FIGURE 12, I have shown the standard grades of olives according to size This illustration is by way of example only since I do not wish to be limited to any particular fruit or vegetables that may be size-graded by my machine.

These olives may be delivered by a hopper 20 onto the upper reach of the sorting and grading rollers C at the front end D of the machine (see FIGURE 2) As these rollers move toward the rear end E of the machine, due to the rotation of the worm shafts F—F, the spacing between adjacent rollers will be progressively increased. This will permit the fruit H, or the like, to gravitate downwardly onto a transverse conveyor G, see FIGURE 3.

Figure 11:
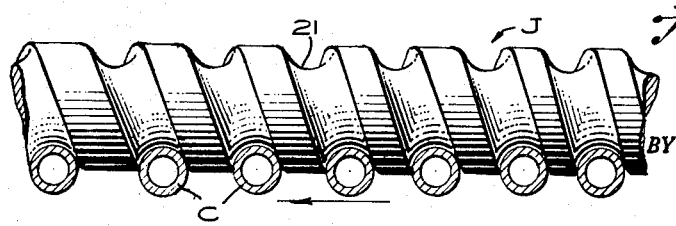
FIGURE 11 is a vertical sectional view taken along the line XI—XI of FIGURE 1, showing an auger coacting with the sorting rollers to prevent the latter from bowing horizontally intermediate of their ends.

It is desirable to employ light-weight tubes for the sorting and grading rollers C. In order to prevent these rollers from bowing horizontally, which would produce inaccurate sorting and grading slots between adjacent rollers at least one longitudinally-extending auger J overlies and engages with the sorting rollers C in the upper reach, see FIGURES 2 and 11. This auger is fashioned with a variable-pitch groove 21, corresponding in pitch with the grooves 19 of the worm shafts, to maintain the upper rollers C parallel with one another throughout their lengths One or more augers J are placed above the upper reach of the rollers C.

Of course the worm shafts F—F and the auger or augers J must be rotated in unison For this purpose I provide a drive mechanism indicated generally at K in FIGURES 1, 2 and 6. As shown, this drive mechanism includes a motor 22, which is operatively connected to a speed-reduction unit 23 to rotate a transverse shaft 24. The latter is provided with sprockets 25 fixed thereto, see FIGURE 6, which are connected by chains 26 to sprockets 27 secured to a countershaft 28.

At the back of the machine there is journalled a pair of vertical shafts 29, see FIGURE 2, which are connected at their lower ends to the countershaft 28 by sets of bevel gears 30, see also FIGURE 6. Morever, upper pairs of bevel gears 31 operatively connect the upper ends of the shafts 29 with the worm shafts C so as to drive the latter in the proper direction to advance the sorting and grading rollers C in the upper reach toward the rear end E of the machine. Sprocket-chain drives 32 interconnect the worm shafts F—F with the auger or augers J so that the former will turn the latter in unison (see FIGURES 1 and 6). The worm shafts F—F and augers J—J will move the rollers C from the rear end of the upper reach onto the wheels 12 where the ends of the rollers will be received in the grooves 13. The continuous feeding of successive rollers C into successive grooves 13 in the peripheries of the wheels 12, will cause these wheels to rotate. No other power source is used for rotating the wheels. The wheels transfer the rollers from the upper to the lower reach.

In order to return the sorting rollers in the lower reach to the front sprockets 14—14 at the feed end D of the machine, a lower set of longitudinally-extending worm shafts L are provided with helical grooves 33 receiving the ends of the lower reach of sorting and grading rollers C (see FIGURE 2). The worm shafts L are driven from the countershaft 28 through bevel gears 34 as shown in FIGURES 2 and 6.

The independent sorting and grading rollers C are positively rotated about their longitudinal axes at a predetermined speed as they move along the upper reach toward the back end E of the machine. This is accomplished by securing sprocket-like pinions 35 to the end portions of these rollers (see FIGURES 1, 4, 7 and 9). An overhead endless chain M is spaced from the feed end D of the machine and has its lower section 36 engaging with the pinions 35 (see FIGURES 4 and 5). This chain section is maintained in driving engagement with the pinions 35 by channel-shaped guides 37, as shown in FIGURE 4. Obviously, only one overhead drive chain M and single sprockets on the rollers C need be provided, if desired.

For supporting each endless chain M, each is trained around front and rear sprockets 38 (see FIGURES 2 and 5-7). The rearmost set of sprockets 38 are fixed to a shaft 39, which is driven from the countershaft 28 through a sprocket-chain drive 40 (see FIGURES 2 and 6), so that the section 36 of the chain M will be advanced in the direction of the arrows 41 (see FIGURES 4 and 5). The drives M are enclosed in suitable housings 38′.

By positively rotating the sorting and grading rollers C in the upper reach, the fruit or the like H will be prevented from "hanging up" on these rollers. When olives are graded some of the olives may initially have their axes extending at an angle to the axes of the parallel rollers. These olives would drop through the spaces between adjacent rollers only when the spaces are wide enough to receive the lengths of the olives. Olives should be graded according to their diameters and not according to their lengths. By positively rotating the rollers C, the olives are also rotated by the rollers and any olives whose axes are not parallel to the roller axes will be rotated and swung parallel to the roller axes. The olives whose axes are aligned with the roller axes will drop through the spaces between the rollers much sooner than when the olive axes are at an angle to the roller axes. Proper grading of the olives results by the positive rotation of the rollers C as they travel along the upper reach and the consequent rotation of the olives to align their axes with the roller axes and the dropping of the olives through the proper width spaces.

Another important structural feature of my machine is to rotate the rollers C at a still higher speed as they pass through the region of the feed end of the upper reach near the hopper 20. This will cause the fruit to produce better sorting operations. For accomplishing this, short stationary rack bars 42 are arranged below the hopper 20 and in advance of the overhead drive chain M (see FIGURES 1, 5, 7 and 8), for engagement by the sprocket-like pinions 35. As the rollers C are moved over the racks 42 by the worm shafts F, the pinions 35 will be rotated as they engage with the racks 42 and the rollers will be rotated faster than when the pinions are rotated by the endless chain M.

Any suitable means may be provided for moving the transverse conveyor G so that the graded and sorted fruit, or the like, may be removed from the machine. For this purpose, I have shown a drive N, which is operated by the countershaft 28 to turn one of the rollers 43 around which the conveyor belt 44 is trained (see FIGURES 2, 3 and 6). The conveyor belt 44 has a width that extends between the front sprockets 14 and the rear sprockets 15.

With respect to the descriptive matter herein to the effect that the endless chain M engages with the pinions 35 to turn the sorting and grading rollers C at a predetermined speed, the situation is as follows: The sorting rollers C travel rather fast around their course; and pinions 35 going over a rack will rotate the rollers too fast, except at the feed end D where the fruit or the like may be scattered a desired amount. The moving chain M, serving as a moving rack, can be geared to turn the sorting rollers at a desired speed, which would be slower than when going over a stationary rack.

Summary

The operation of my machine for size-grading fruit or the like, is summarized briefly as follows:

Assuming that the drive mechanism K has been placed in operation, the worm shafts F—F will be rotated so as to advance the endless series of sorting and grading rollers C along the upper reach of the spaced-apart guideways B. These rollers will be gradually moved apart, relative to one another, as they move in the direction of the arrows 17 from the front feed end D of the machine toward the rear end E thereof. This is due to the gradually-increasing variable-pitch of the grooves 19 of the worm shafts into which the ends of the sorting rollers extend.

As the sorting rollers pass through the region of the feed end of the machine, their sprocket-like pinions 35 will engage with the stationary rack bars 42, causing these rollers to positively rotate about their longitudinal axes, and result in spreading out the fruit H as the latter is discharged from the chute 20 onto the upper reach of sorting rollers.

During advancement of the sorting rollers toward the rear end E of the machine, their sprocket pinions 35 engage with the lower section 36 of the overhead endless chain M, which is being driven in the direction of the arrows 41. This will cause the sorting rollers to continue to rotate about their longitudinal axes, but at a slower speed than when they are rotated by the racks 42. The rotating rollers C facilitate the passage of the fruit, or the like, downwardly through the spaces provided between adjacent rollers C.

The auger or augers J, which have their variable-pitch grooves 21 arranged to receive portions of the sorting rollers C from above, are rotated in unison with the worm shafts F—F. This will preclude these rollers from bowing horizontally and the spaces between the adjacent rollers will be uniform in width throughout their entire lengths thus producing accurate sorting of the fruit according to size.

When the sorting rollers enter the peripheral notches 13 of the end sprockets 12—12, they are translated downwardly into the lower reach of the guideways B. Here the bottom set of rotating worm shafts L—L engage with the ends of the sorting rollers, moving the rollers to the peripheral notches 15 of the front sprockets 14—14. The latter pick up the returned sorting rollers and elevate them back to the upper reach for passing again around the orbital path of the guideways. The lower worm shafts have one or more changes in the spacing between adjacent loops in the spiral grooves. The spacing is wide at the receiving ends to receive grading rollers from the rear sprockets 12 and then the spacing is narrow at the exit ends so as to feed the grading rollers into the grooves 15 of the front sprockets 14. The sorted fruit gravitates downwardly onto the transverse conveyor G, where it may be transferred in accordance with further requirements.

I show a modified form of worm shaft and auger in FIGURES 13 and 14. In certain cases where there is a continual widening of the spaces between adjacent grading rollers C as they travel from the feed to the exit end of the machine, the fruit, such as olives, may not have sufficient time to change their positions from ones where their axes extend at various angles with respect to the parallel axes of the grading rollers into positions where their axes will parallel the grading roller axes before the olives should drop between the rollers for proper grading. Therefore the olives will be carried farther along by the grading rollers than they should before dropping through the spaces between adjacent rollers and an improper grading of the fruit is the result.

The lengths of the worm shafts R in FIGURES 13 and 14 are divided into a plurality of sections. I have shown eight successive sections in the worm shafts R in FIGURE 13 and these are designated from R1 through R8, inclusive. When grading olives, each worm shaft section is about six inches long although I do not wish to be limited to any particular length of section or to any particular number of sections.

The section R1 in the worm shaft R is placed at the feed end of the machine and the spiral groove 50 in this section has a width equal to the outer diameter of the grading rollers C whose ends are received in the groove. An integral spiral rib 51 on the worm shaft R has a definite width and this same width is maintained throughout the entire length of the section R1. Therefore the grading rollers C will be evenly spaced from each other throughout the entire length of the section R1 and olives will be rotated by the rollers until those olives having widths equal to these spacings will be dropped between the rollers for proper grading of this sized olive.

In FIGURE 14, I have shown the worm shaft R on a much larger scale. The section R1 has the spiral groove 50 therein and the groove has a width equal to the outer diameter of the grading rollers C. This groove width remains the same throughout all of the sections R1 to R8 in the entire length of the worm shaft R. Also FIGURE 14 illustrates the next worm shaft section R2. The spiral rib 51 has the same width indicated at $a$ throughout the section R1 and then at the juncture between the sections R1 and R2, the rib is rapidly increased to a slightly wider width indicated at $c$ and this increase is accomplished throughout the angular distance $b$. Then the new width $c$ will remain the same throughout the section R2. Therefore the grading rollers C as they move from the section R1 into the section R2, will be quickly spaced farther apart and will maintain this same increased spacing throughout the entire length of the section R2.

The olives or other fruit having a slightly larger diameter will be given time while traveling through the section R2, to be rotated by the rotating grading rollers C so that the fruit whose axes do not parallel the roller axes will be turned until all of their axes are in parallel and then the fruit with diameters equal to the increased width of the spacings between the rollers, will drop through these spaces and will be graded properly. The width of the groove 50 remains the same throughout the section R2 as it was in the section R1. Therefore the grading rollers C in the section R2 will have their ends received in the grooves 50 in the two worm shafts R and a rotation of the shafts at the same speed will advance the rollers through the section.

A portion of the third section R3 is shown in FIGURE 14 and the rib width in this section is indicated at $d$ and is slightly wider than the width $c$ of the rib. The width of the groove 50 does not change. Sections R4 through R6 are not illustrated in FIGURE 14, but a portion of section R7 and all of section R8 are illustrated. A machine may have worm shafts R of two or more sections. Each section may be of any desired length. A step-wise increasing of the spacings between adjacent grading rollers C is effected by the rapid increase in width of the rib 51 as the helical rib extends through the various sections. Each section is long enough to give sufficient time for the proper grading of the fruit.

In FIGURE 14, only a portion of the worm shaft section R7 is shown and all of the section R8 with the exception that the section R8 is broken to indicate that it may be of any length desired. The helical rib 51 has increased to the width $e$ in section R7 and to the width $f$ in section R8. The helical groove 50 has not increased in width.

If the grading rollers C are long and yet have small outer diameters, the machine may be provided with one or more grade roller spacing augers T, see FIGURE 13. These augers will have as many sections T1 to T8 as do the worm shafts R. The helical grooves 53 in the augers T will receive portions of the grading rollers C. The helical ribs 54 on the augers will be step-wise increased in width from section to section in exactly the same order and to the same extent as the ribs 51 on the worm shafts R are step-wise increased in width. The augers T will prevent the grading rollers from bowing between their ends and will cause adjacent rollers to maintain spaces having the same widths throughout the entire lengths of the rollers.

The operation of the modified form of the device will be the same as in the preferred form. The only difference is that in the modified form the grading rollers C are maintained at a predetermined spacing for a given length of travel of the rollers along the machine and then the spacing is quickly increased to a desired greater width and is then maintained at this same width for another given length of travel. The spacings between adjacent rollers are thus step-wise increased two or more times as the rollers move from the feed end of the machine to the exit end. In all other respects the operation of the modified form of machine is the same as the preferred form and no additional description need be given.

The curved guideway portions 16 in FIGURES 1 and 13 are shown extending entirely across the width of the machine. In actual practice the curved guideways portions will be arcuate bars that will hold the ends of the rollers C in the transverse grooves 13 in the sprockets 12 as the rollers are moved from the upper reach to the lower reach. Also arcuate bars will hold the ends of the rollers C in the transverse grooves 15 in the sprockets 14 as the rollers are moved from the lower reach back up to the upper reach at the feed end of the machine.

With the curved guideway portions 16 limited to arcuate bars for holding the roller ends in the grooves 13 in the spaced apart and parallel sprockets 12, then the area between these sprockets is unencumbered and any oversized fruit that will not drop through the spaces between adjacent rollers C or any sticks or other foreign matter on the upper reach will be discharged off from the end of the machine.

I claim:
1. A machine for size-grading fruit or the like comprising:
   (a) a frame having a feed end;
   (b) a plurality of fruit-grading rollers extending transversely across said frame;
   (c) a pair of endless guides for the ends of said rollers, a guide being disposed at each side of said frame, said guides arranging the rollers in an upper reach for receiving fruit from the feed end of the machine and arranging the rollers in a lower reach that extends back to the feed end;
   (d) a first pair of worm shafts arranged along the sides of the frame and adjacent to the upper reach of said endless guides, said worm shafts extending from the feed end of the machine and having spiral grooves for receiving the ends of said rollers and for spacing said rollers apart in the upper reach;
   (e) means for rotating said form shafts for advancing said grading rollers independently of each other and along the upper reach from the feed end of the machine to the opposite end; said form shafts holding said rollers in parallel spaced apart relation as said rollers are moved;
   (f) means for positively rotating said rollers about their own axes as said rollers are moved along said upper reach for rotating the fruit on the rollers;
   (g) a first pair of spaced apart sprockets rotatably mounted in the machine at the opposite end from the feed end and having spaced apart roller-receiving grooves on their rims for receiving the ends of said rollers on the upper reach when the rollers reach the ends of the spiral grooves in said worm shafts, said sprockets conveying said rollers in spaced relation from the upper to the lower reach;
   (h) a second pair of worm shafts arranged along the sides of the frame and adjacent to the lower reach of said endless guides, and having spiral grooves for receiving the roller ends as they leave said sprocket grooves;
   (i) said means for rotating said first pair of worm shafts also rotating said second pair of worm shafts for moving said rollers along the lower reach and toward said feed end of the machine;
   (j) a second pair of spaced apart sprockets rotatably mounted in the feed end of the machine and having spaced apart roller-receiving grooves on their rims for receiving the ends of said rollers on the lower reach when the rollers reach the ends of the spiral grooves in said second pair of worm shafts, said second pair of sprockets conveying said rollers in spaced relation from the lower to the upper reach;
   (k) the fruit on the rollers in the upper reach being rotated by the rollers until the axes of the fruit parallels the axes of said rollers, where upon the fruit having diameters equal to the spacings between adjacent rollers will drop by gravity through the spacings; and
   (l) means for removing the fruit that has dropped through the spacings between adjacent rollers in the upper reach.

2. The combination as set forth in claim 1: and in which
   (a) means is provided for initially rotating the rollers in the upper reach and at the feed end of the machine at a faster speed for spreading the fruit as it is received by these rollers.

3. The combination as set forth in claim 1: and in which
   (a) said first pair of worm shafts having their spiral grooves gradually increasing in pitch from the feed end of the machine for g radually increasing the space between adjacent rollers as they move from the feed end toward the opposite end of the machine.

4. The combination as set forth in claim 1: and in which
   (a) at least one auger parallels the first pair of worm shafts and overlies the rollers on the upper reach;
   (b) said auger having a spiral groove for receiving portions of the rollers disposed between the ends of the rollers for maintaining these portions of the rollers the same distance apart as the ends of the rollers;
   (c) the spiral groove in the auger being at the same pitch as the spiral grooves in said first pair of worm shafts.

5. The combination as set forth in claim 3: and in which
   (a) at least one auger parallels the first pair of worm shafts and overlies the rollers on the upper reach;
   (b) said auger having a spiral groove for receiving portions of the rollers disposed between the ends of the rollers for maintaining these portions of the rollers the same distance apart as the ends of the rollers;
   (c) the spiral groove in the auger gradually increasing in pitch in the same manner as the pitch is gradually increased in said first pair of worm shafts.

6. The combination as set forth in claim 5: and in which
   (a) the grooves in the first pair of spaced apart sprockets are spaced farther apart than are the grooves in the second pair of spaced apart sprockets;
   (b) the spiral grooves in said second pair of worm shafts having a pitch at the ends disposed adjacent to said first pair of sprockets that will receive the rollers from said first pair of sprockets; and
   (c) said spiral grooves in said second pair of worm shafts will have their pitch changed at the ends disposed adjacent to said second pair of spaced apart sprockets that will cause the second pair of worm shafts to deliver the rollers in proper spaced relation to the grooves in said second pair of sprockets.

7. A machine for size-grading fruit or the like comprising:
   (a) a frame having a feed end;

(b) a plurality of fruit-grading rollers extending transversely across said frame;
(c) a pair of endless guides for the ends of said rollers, a guide being disposed at each side of said frame, said guides arranging the rollers in an upper reach for receiving fruit from the feed end of the machine and arranging the rollers in a lower reach that extends back to the feed end;
(d) a first pair of worm shafts arranged along the sides of the frame and adjacent to the upper reach of said endless guides, said worm shafts extending from the feed end of the machine and having spiral grooves for receiving the ends of said rollers and for spacing said rollers apart in the upper reach;
(e) said first pair of worm shafts having their spiral grooves of the same pitch for a predetermined distance and then increased in pitch with the increased pitch being maintained for a successive predetermined distance;
(f) means for rotating said worm shafts for advancing said grading rollers independently of each other and along the upper reach from the feed end of the machine to the opposite end; said worm shafts holding said rollers in parallel spaced apart relation as said rollers are moved;
(g) means for positively rotating said rollers about their own axes as said rollers are moved along said upper reach for rotating the fruit on the rollers;
(h) a first pair of spaced apart sprockets rotatably mounted in the machine at the opposite end from the feed end and having spaced apart roller-receiving grooves on their rims for receiving the ends of said rollers on the upper reach when the rollers reach the ends of the spiral grooves in said worm shafts, said sprockets conveying said rollers in spaced relation from the upper to the lower reach;
(i) a second pair of worm shafts arranged along the sides of the frame and adjacent to the lower reach of said endless guides, and having spiral grooves for receiving the roller ends as they leave said sprocket grooves;
(j) said means for rotating said first pair of worm shafts also rotating said second pair of worm shafts for moving said rollers along the lower reach and toward said feed end of the machine;
(k) a second pair of spaced apart sprockets rotatably mounted in the feed end of the machine and having spaced apart roller-receiving grooves on their rims for receiving the ends of said rollers on the lower reach when the rollers reach the ends of the spiral grooves in said second pair of worm shafts, said second pair of sprockets conveying said rollers in spaced relation from the lower to the upper reach;
(l) the fruit on the rollers in the upper reach being rotated by the rollers until the axes of the fruit parallels the axes of said rollers, whereupon the fruit having diameters equal to the spacings between adjacent rollers will drop by gravity through the spacings; and
(m) means for removing the fruit that has dropped through the spacings between adjacent rollers in the upper reach.

8. The combination as set forth in claim 7: and in which
(a) at least one auger parallels the first pair of worm shafts and overlies the rollers on the upper reach;
(b) said auger having a spiral groove for receiving portions of the rollers disposed between the ends of the rollers for maintaining these portions of the rollers the same distance apart as the ends of the rollers;
(c) the spiral groove in the auger changing in pitch in the same manner as the pitch is changed in said first pair of worm shafts.

9. A machine for size-grading fruit or the like comprising:
(a) a frame having a feed end;
(b) a plurality of fruit-grading rollers extending transversely across said frame and providing an upper reach for receiving fruit;
(c) a first pair of worm shafts arranged along the sides of the frame and having helical grooves for receiving the ends of said rollers;
(d) means for rotating said worm shafts in unison for moving the rollers in spaced relation from the feed end to the opposite end of the machine;
(e) a first pair of spaced apart and free rotating sprockets mounted at said opposite end of said machine and having spaced apart roller-receiving grooves in their peripheries for receiving the ends of said rollers as they are moved by said worm shafts onto said sprockets, the rotation of said sprockets being caused solely by the rollers being successively moved into successive grooves in the sprockets;
(f) said sprockets transferring said rollers from the upper to a lower reach that extends from said sprockets back to the feed end of said machine;
(g) a second pair of worm shafts arranged along the sides of the lower reach of said rollers and having helical grooves for receiving the roller ends in the lower reach as they leave said sprockets;
(h) means for rotating said second pair of worm shafts for advancing said rollers in the lower reach in spaced relation;
(i) a second pair of spaced apart and free rotating sprockets mounted at the feed end of said machine and having roller-receiving grooves in their peripheries for receiving the ends of said rollers as they are moved by said second worm shafts into the spaced apart grooves in said second sprockets, the rotation of said second sprockets being caused solely by the rollers being successively moved by said second worm shafts into successive grooves in said second sprockets;
(j) said second sprockets returning said rollers to the free end of said machine where they will be received by the helical grooves in said first worm shafts;
(k) said first pair of worm shafts having their spiral grooves of the same pitch for a predetermined distance and then increased in pitch quickly with the increased pitch being maintained for a successive predetermined distance; and
(l) means for positively rotating said rollers about their own axes as said rollers are moved along said upper reach for rotating the fruit on the rollers and causing the axes of the fruit to swing into parallel arrangement with the axes of said rollers.

10. A machine for size-grading fruit or the like comprising:
(a) a frame having a feed end;
(b) a plurality of fruit-grading rollers extending transversely across said frame;
(c) a pair of endless guides for the ends of said rollers, a guide being disposed at each side of said frame, said guides arranging the rollers in an upper reach for receiving fruit from the feed end of the machine and arranging the rollers in a lower reach that extends back to the feed end;
(d) a first pair of worm shafts arranged along the sides of the frame and adjacent to the upper reach of said endless guides, said worm shafts extending from the feed end of the machine and having spiral grooves for receiving the ends of said rollers and for spacing said rollers apart in the upper reach;
(e) said first pair of worm shafts having their spiral grooves gradually increasing in pitch from the feed end of the machine for gradually increasing the space between adjacent rollers as they move from the feed end toward the opposite end of the machine;

(f) means for rotating said worm shafts for advancing said grading rollers independently of each other and along the upper reach from the feed end of the machine to the opposite end; said worm shafts holding said rollers in parallel spaced apart relation as said rollers are moved;

(g) a first pair of spaced apart sprockets rotatably mounted in the machine at the opposite end from the feed end and having spaced apart roller-receiving grooves on their rims for receiving the ends of said rollers on the upper reach when the rollers reach the ends of the spiral grooves in said worm shafts, said sprockets conveying said rollers in spaced relation from the upper to the lower reach;

(h) a second pair of worm shafts arranged along the sides of the frame and adjacent to the lower reach of said endless guides, and having spiral grooves for receiving the roller ends as they leave said sprocket grooves;

(i) said means for rotating said first pair of worm shafts also rotating said second pair of worm shafts for moving said rollers along the lower reach and toward said feed end of the machine;

(j) a second pair of spaced apart sprockets rotatably mounted in the feed end of the machine and having spaced apart roller-receiving grooves on their rims for receiving the ends of said rollers on the lower reach when the rollers reach the ends of the spiral grooves in said second pair of worm shafts, said second pair of sprockets conveying said rollers in spaced relation from the lower to the upper reach;

(k) means for removing the fruit that has dropped through the spacings between adjacent rollers in the upper reach.

11. The combination as set forth in claim 10: and in which (a) said pair of endless guides including semicircular guide portions cooperating with said first and second pairs of sprockets for holding the ends of said rollers received in said sprocket grooves, in said grooves as the sprockets successively transfer the rollers from the upper to the lower reach at one end of the machine and from the lower to the upper reach at the feed end of the machine.

References Cited by the Examiner

UNITED STATES PATENTS

| | | | |
|---|---|---|---|
| 2,411,274 | 11/1946 | Kerian | 209—106 |
| 2,441,154 | 5/1948 | Kerian | 209—106 |
| 2,575,744 | 11/1951 | Burt | 198—167 X |
| 2,988,781 | 6/1961 | Meyer | 209—106 X |

M. HENSON WOOD, JR., *Primary Examiner.*

J. N. ERLICH, *Assistant Examiner.*